United States Patent Office 2,773,914
Patented Dec. 11, 1956

2,773,914

MAKING DIARYLETHANES

Erhard J. Prill, Dayton, Ohio, assignor to Monsanto Chemical Company, St. Louis, Mo., a corporation of Delaware No Drawing. Application March 19, 1953,
Serial No. 343,519

20 Claims. (Cl. 260—668)

This invention relates to the manufacture of diarylethanes. In specific aspects the invention pertains to new catalysts for the manufacture of 1,1-diarylethanes by condensation of aromatic hydrocarbons with acetylene.

Diarylethanes can be pyrrolyzed to produce vinylaryl compounds which of course have great interest as monomers in the plastics and rubber industries. Only a few catalysts have heretofore been known for use in the manufacture of diarylethanes by condensation of aromatic hydrocarbons with acetylene. It is apparent that the provision of new catalysts for this reaction would be of importance.

An object of this invention is to produce diarylethanes. Another object of the invention is to provide new catalysts for the condensation of acetylene with aromatic hydrocarbons. Yet another object is to provide a method for manufacturing 1,1-ditolylethane. A further object is to provide a method for manufacturing 1,1-dixylylethane. Further objects and advantages of the invention will be apparent to those skilled in the art from the accompanying disclosure and discussion.

In accordance with the present invention the condensation of acetylene with aromatic hydrocarbons is effected in the presence of the following materials as catalysts: A. zinc chloride, B. phosphoric acid, ranging in strength from 85 percent $H_3PO_4$—15 percent $H_2O$ up through tetraphosphoric acid, with or without added ions of mercury, cadmium, zinc, copper or silver.

The catalysts of the present invention are known to be much weaker acids than catalysts which have heretofore been used for this reaction. I have surprisingly found that the named materials are catalytically active towards the condensation of acetylene with aromatic hydrocarbons, resulting in the selective formation of 1,1-diarylethanes wherein the aryl groups correspond to the aromatic hydrocarbon reacted.

When zinc chloride is employed as catalyst, it is usually desirable that some water be present in the reaction mixture, either as part of the catalyst composition or in admixture with the reactants introduced into the system. I prefer to employ a liquid zinc chloride catalyst, i. e., $ZnCl_2$ in admixture with sufficient water to be liquid at the reaction conditions chosen. Preferably from 5 to 25 parts of water by weight per 100 parts $ZnCl_2$ are employed.

Regular commercial 85 percent orthophosphoric acid (85 parts $H_3PO_4$+15 parts $H_2O$) can be employed as a catalyst for the reaction. Preferably however stronger phosphoric acid is used ranging up to 100 percent $H_3PO_4$ and up into even higher stages of dehydration to a point corresponding to tetraphosphoric acid. Phosphoric acids are often considered to be mixtures of phosphorus pentoxide ($P_2O_5$) and water in varying proportions, the chemist recognizing that the particular chemical interaction between $P_2O_5$ and $H_2O$ in phosphoric acids of varying strengths will vary and their exact nature is not necessarily known in all cases. Eighty-five percent $H_3PO_4$ can be described as a phosphoric acid containing 61.5 percent $P_2O_5$. Phosphoric acid of 100 percent strength contains 72.3 weight percent of $P_2O_5$. Tetraphosphoric acid contains about 82 to 85 weight percent $P_2O_5$.

The phosphoric acids mentioned in the preceding paragraph can be used alone as catalysts in accordance with the present invention. However, in many instances the catalytic activity is greatly enhanced through the addition of a small quantity of ions of one or more of the metals mercury, cadmium, zinc, copper or silver. Any compound of the named materials having sufficient solubility in the phosphoric acid used to provide an effective amount of the metal ion in its higher valence state can be employed. Thus, the phosphates, sulfates, acetates, chlorides, oxides, or even salts of the materials in their lower valence states in the presence of an added oxidizing agent such as ferric salts that will result in the higher valence state of metal ions can be used in particular situations. The quantity of mercury, cadmium, zinc, copper, or silver ion should be below 1 weight percent of the acid when calculated to the basis of $Hg_3(PO_4)_2$. While 0.75 weight percent is quite satisfactory, smaller quantities, in some instances as low as 0.1 weight percent, can be used.

I ordinarily prefer to employ my catalysts in liquid form, providing sufficient agitation to result in intimate contact between hydrocarbon reactants and catalyst. However, solid form catalysts are sometime advantageous. They can be made by incorporating the phosphoric acid in question with or without the metallic ion, with a solid particulate carrier material such as a clay. Even in the case of the normally solid zinc chloride, it is better to support it on an inert carrier, e. g., alumina, clay, silica gel, having extended surface area rather than to use particles of zinc chloride per se which would not have sufficient physical strength for best results. Solid catalysts are best used by maintaining a stationary bed of the catalyst particles in a catalyst chamber through which the reaction mixture is passed at suitable conditions of temperature, pressure, and contact time. With liquid catalysts, the catalyst and hydrocarbon reactants can be forced through a reaction zone under conditions providing intimate contact. Suitable apparatus may be a reaction vessel having an efficient stirrer therein, or may be an elongated tube of sufficiently small cross section and/or with such convolutions as to cause, under the conditions of use, turbulent flow and mixing of the ingredients of the reaction mixture. The reaction can be carried out in batchwise manner but for commercial practice it is preferred to effect the reaction continuously. In the case of liquid catalysts a phase separation is made of the final reaction mixture into catalyst phase and organic phase and the former is recycled to the reaction. Naturally there is some spending of catalyst, and any of the well-known procedures can be used for purifying and/or fortifying catalyst and maintaining it at desired strength. Adequate means should be provided in all cases for removal of the exothermic heat of reaction.

It will be appreciated that the various materials and combinations of materials making up catalysts of the present invention will differ greatly among themselves as to catalytic activity, and cannot be considered to be the full equivalents of each other. Naturally, the more active the catalyst the lower the temperature and pressure permissible for adequate rate of reaction. Furthermore, rate of reaction is dependent upon the particular aromatic hydrocarbon employed as well as the ratio of aromatic hydrocarbon to acetylene in the reaction mixture. Thus, reactants, catalyst, temperature, pressure, degree of agitation, and contact time are all interrelated variables. Those skilled in the art having had the benefit of the present disclosure will readily select a combination of these variables to give the desired results.

The reaction is generally applicable to aromatic hydrocarbons. Preferably those containing a single benzene ring are used, although the reaction can also be applied to polycyclic aryl hydrocarbons, for example naphthalene and alkylnaphthalenes. Benzene and mono- and polyalkylbenzenes, and particularly mono- and dialkylbenzenes are suitable reactants. By way of further specific examples, there can be mentioned toluene, xylene (either ortho-, para-, or meta-xylene or mixtures of same), ethylbenzene, mesitylene, cumene, diethylbenzene, biphenyl. Those skilled in the art will understand that aromatic hydrocarbons containing non-hydrocarbon groups which do not interfere with the reaction can be employed.

It is desirable that in the final reaction mixture after the completion of the reaction there still be a considerable excess of unreacted aromatic hydrocarbon. Preferably the mole ratio of aromatic hydrocarbon charged to total acetylene charged is at least 3:1, and 4:1 usually gives higher yields. Still higher ratios can be used, but beyond the range of about 4:1 to 6:1 little improvement is obtained in overall yield and the removal of the additional unreacted aromatic hydrocarbon from the final reaction mixture is an added expense. It can be stated that generally a mole ratio of total aromatic hydrocarbon charged to total acetylene charged should be within the range of 3:1 to 8:1 and preferably within the range of 4:1 to 6:1.

A suitable quantity of catalyst in a particular situation can be chosen by those skilled in the art. Sufficient catalyst should be used to permit efficient dispersion of catalyst with hydrocarbons. Ordinarily the liquid volume of catalyst should be at least 0.3 volume per 1 volume of aromatic hydrocarbon charged. It is preferred that the ratio of liquid volume of catalyst to liquid volume of aromatic hydrocarbon charged be at least 0.4:1. In some instances it may be advantageous to use as much as 1 volume of catalyst per volume of hydrocarbon. In the case of solid catalysts the same criterion can be used, considering the volume of the solid rather than volume of liquid catalyst. Where reactants are passed through a body of solid catalyst, or through a body of liquid catalyst that remains essentially within a single reaction vessel while hydrocarbon passes therethrough, the rate of flow of reactants will, of course, be chosen to give the desired extent of reaction, and a contact time of from 1 to 30 minutes and occasionally longer will be customary.

The pressure chosen for carrying out the reaction will, as indicated above, be related to the other reaction variables. While operation at atmospheric pressure is not outside of the scope of the invention, I prefer to use superatmospheric pressures. Even those catalysts that are sufficiently active for good results at atmospheric pressure will generally provide more efficient operation when superatmospheric pressure is used. I prefer to maintain a partial pressure of acetylene of at least 25 pounds per square inch. With increased pressures, it is often desirable especially to avoid explosive concentrations of acetylene to use also an inert gas, e. g., nitrogen, $CO_2$, or inert gases present in commercial acetylene-containing gases. There is no particular upper pressure limitation other than that dictated by reasons of safety. A total pressure of 500 pounds per square inch will be quite sufficient for almost any purpose. The art has already been sufficiently informed of the techniques necessary for safe handling of acetylene in carrying out chemical reactions, that it is not considered necessary to do more here than to indicate that suitable pressures should be used and indicate conditions that are preferred with respect to the carrying out of the present invention.

Elevated temperatures should be used for the process of the present invention. Here again the temperature chosen will be related to the other reaction conditions, low temperatures being used with higher pressures, more active catalysts and more reactive aromatic hydrocarbons. Temperatures within the range of 100 to 200° C. are usually satisfactory, although higher temperatures are not beyond the broad scope of the invention.

The following examples are presented to illustrate some combinations of reactants, catalysts, and reaction conditions suitable for carrying the invention into effect. It will be appreciated that the invention is not limited to the exact combinations set forth therein.

EXAMPLE 1

A reaction vessel was charged with 636 grams (6.0 moles) nitration grade xylene, 500 grams tetraphosphoric acid and 5 grams mercuric phosphate, i. e., $Hg_3(PO_4)_2$. The temperature was maintained at 129 to 132° C. During a reaction time of 5 hours, 39 grams (1.5 moles) acetylene was gradually introduced into the reaction vessel maintained at atmospheric pressure. The reaction mixture was vigorously agitated with a high-speed stirrer.

The final reaction mixture was subjected to distillation to separate unreacted xylene, 1,1-dixylylethane, and heavier arylated compounds. 1,1-Dixylylethane was recovered in a yield of 136 grams.

EXAMPLES 2 TO 9

The reactions constituting Examples 2 to 8 set forth in the following table were carried out at superatmospheric pressure in a stainless steel shaker bomb. The reaction of Example 9 was carried out in a stainless steel stirred autoclave. In each case the pressure vessel was charged with aromatic hydrocarbon and catalyst, flushed with nitrogen at atmospheric pressure, pressured to 30 to 75 pounds per square inch (p. s. i.) with nitrogen, heated to reaction temperature, and then pressured further with acetylene to the maximum pressure of the pressure range given in the table. In some instances the vessel was pressured more than once with acetylene.

Table

CONDENSATION OF ACETYLENE WITH AROMATICS UNDER PRESSURE

| Example No. | Aromatic | | Catalyst | Acetylene-$N_2$ pressure (lbs./in.²) | Temp. (° C.) | Time (hrs.) | Diarylethane (grams) |
|---|---|---|---|---|---|---|---|
| | Grams | Moles | | | | | |
| 2 | Xylene 848 | 8.0 | Tetraphosphoric acid (500 g.)—$Hg_3(PO_4)_2$ (5 g.) | 120–200 | 120 | 3.75 | 75 |
| 3 | do | 8.0 | $ZnCl_2$ (400 g.)—$H_2O$ (50 g.) | 150–250 | 160 | 16.0 | 49 |
| 4 | do | 8.0 | 100% $H_3PO_4$ (560 g.)—Zn acetate (10 g.)—Acetic acid (50 g.) | 150–285 | 160–180 | 28.0 | 81 |
| 5 | do | 8.0 | 100% $H_3PO_4$ (560 g.) + Zn acetate (10 g.) | 195–250 | 190 | 43.5 | 84 |
| 6 | do | 8.0 | $H_3PO_4$ + $Zn_3(PO_4)_2$ on diatomaceous earth.[1] | 165–248 | 200 | 8.5 | 28 |
| 7 | Toluene 736 | 8.0 | $ZnCl_2$ (400 g.) + $H_2O$ (50 g.) | 140–230 | 177 | 9.0 | 75 |
| 8 | Xylene 848 | 8.0 | 100% $H_3PO_4$ (560 g.) | 165–260 | 190 | 39 | 51 |
| 9 | Toluene 368 | 4.0 | $ZnCl_2$ (200 g.) + $H_2O$ (25 g.) | 94–152 | 173 | 3 | 27 |

[1] A solution of $Zn_3(PO_4)_2$ (20 g.) and 85% $H_3PO_4$ (300 g.) was mixed thoroughly with 100 grams of Hiflo Supercel (a diatomaceous earth). The rather dry mix was baked 4 hours in a furnace at 250° C. to give 350 grams of catalyst.

EXAMPLE 10

A Pyrex glass-lined rocker bomb was employed to carry out the condensation of acetylene with xylene under pressure at 180° C. in the presence of 100 percent phosphoric acid in the manner indicated for the preceding examples. 1,1-dixylylethane was recovered as product. The relative proportion of 1,1-dixylylethane to higher boiling reaction products was greater in this instance than in Example 8.

While the invention has been described herein with particular reference to various preferred embodiments thereof, and examples have been given of suitable proportions and conditions, it will be appreciated that variations from the details given herein can be effected without departing from the invention in its broadest aspects.

I claim:

1. In the condensation of acetylene with aromatic hydrocarbon to form diarylethane, the improvement which comprises employing as sole catalyst a material selected from the group consisting of: A, zinc chloride plus water; B, phosphoric acid ranging from 85 percent $H_3PO_4$ up through increasing extent of dehydration to tetraphosphoric acid; and C, phosphoric acid ranging from 85 percent $H_3PO_4$ up through increasing extent of dehydration to tetraphosphoric acid and containing an effective amount of ions of a metal selected from the group consisting of mercury, cadmium, zinc, copper and silver.

2. In the condensation of acetylene with aromatic hydrocarbon to form diarylethane, the improvement which comprises employing as sole catalyst a phosphoric acid ranging from 85 percent $H_3PO_4$ up through increasing extent of dehydration to tetraphosphoric acid.

3. A process according to claim 2 wherein said catalyst is 85 percent orthophosphoric acid.

4. A process according to claim 2 wherein said catalyst is 100 percent orthophosphoric acid.

5. A process according to claim 17 wherein said catalyst is 100 percent orthophosphoric acid containing an effective amount of zinc ions.

6. A process according to claim 2 wherein said catalyst is tetraphosphoric acid.

7. A process according to claim 17 wherein said catalyst is tetraphosphoric acid containing mercuric ions.

8. A process according to claim 17 wherein said catalyst is a solid composite of phosphoric acid containing zinc ions with a clay support.

9. A process according to claim 17 wherein said catalyst is a phosphoric acid containing a compound of a metal selected from the group consisting of mercury, cadmium, zinc, copper and silver providing ions of said metal in amount effective to enhance the catalytic activity, said compound being present in an amount less than 1 weight per cent (calculated as mercuric phosphate) based on the acid.

10. In the condensation of acetylene with aromatic hydrocarbon to form diarylethane, the improvement which comprises employing zinc chloride plus water as catalyst.

11. In the condensation of acetylene with aromatic hydrocarbon to form diarylethane, the improvement which comprises employing as catalyst a liquid mixture of zinc chloride with from 5 to 25 parts water per 100 parts zinc chloride by weight.

12. A process for condensing aromatic hydrocarbons with acetylene to form 1,1-diarylethanes which comprises subjecting an aromatic hydrocarbon to contact with acetylene at superatmospheric pressure in the presence of catalytic amounts of a material, which material is the sole catalyst present, selected from the group consisting of: A, zinc chloride plus water; B, phosphoric acid ranging from 85 percent $H_3PO_4$ up through increasing extent of dehydration to tetraphosphoric acid; and C, phosphoric acid ranging from 85 percent $H_3PO_4$ up through increasing extent of dehydration to tetraphosphoric acid and containing an effective amount of ions of a metal selected from the group consisting of mercury, cadmium, zinc, copper and silver.

13. A process according to claim 12 wherein the mole ratio of aromatic hydrocarbon charged to total acetylene charged is at least 3:1.

14. A process according to claim 13 wherein said aromatic hydrocarbon is toluene.

15. A process according to claim 13 wherein said aromatic hydrocarbon is xylene.

16. A process according to claim 13 wherein the reaction temperature is within the range of 100° C. to 200° C.

17. In the condensation of acetylene with aromatic hydrocarbon to form diarylethane, the improvement which comprises employing as sole catalyst a phosphoric acid ranging from 85 percent $H_3PO_4$ up through increasing extent of dehydration to tetraphosphoric acid and containing an effective amount of ions of a metal selected from the group consisting of mercury, cadmium, zinc, copper and silver.

18. A process according to claim 2 wherein said aromatic hydrocarbon is selected from the group consisting of toluene and xylene.

19. A process according to claim 10 wherein said aromatic hydrocarbon is selected from the group consisting of toluene and xylene.

20. A process according to claim 17 wherein said aromatic hydrocarbon is selected from the group consisting of toluene and xylene.

References Cited in the file of this patent

UNITED STATES PATENTS 2,402,243     Egloff     June 18, 1946

OTHER REFERENCES

"Boron Trifluoride and its Derivatives," Booth et al.; published by John Wiley & Sons, New York (1949), page 168 relied on.

Chemical Abstracts, vol. 44, col. 4888, 4889, abstract of article by Vaiser "Doklady Akad Nauk," SSSR, vol. 70 (1950), pages 621–624.